Nov. 13, 1956 G. B. DOREY 2,770,331
BRAKE SLACK ADJUSTER
Filed Feb. 7, 1955 2 Sheets-Sheet 1
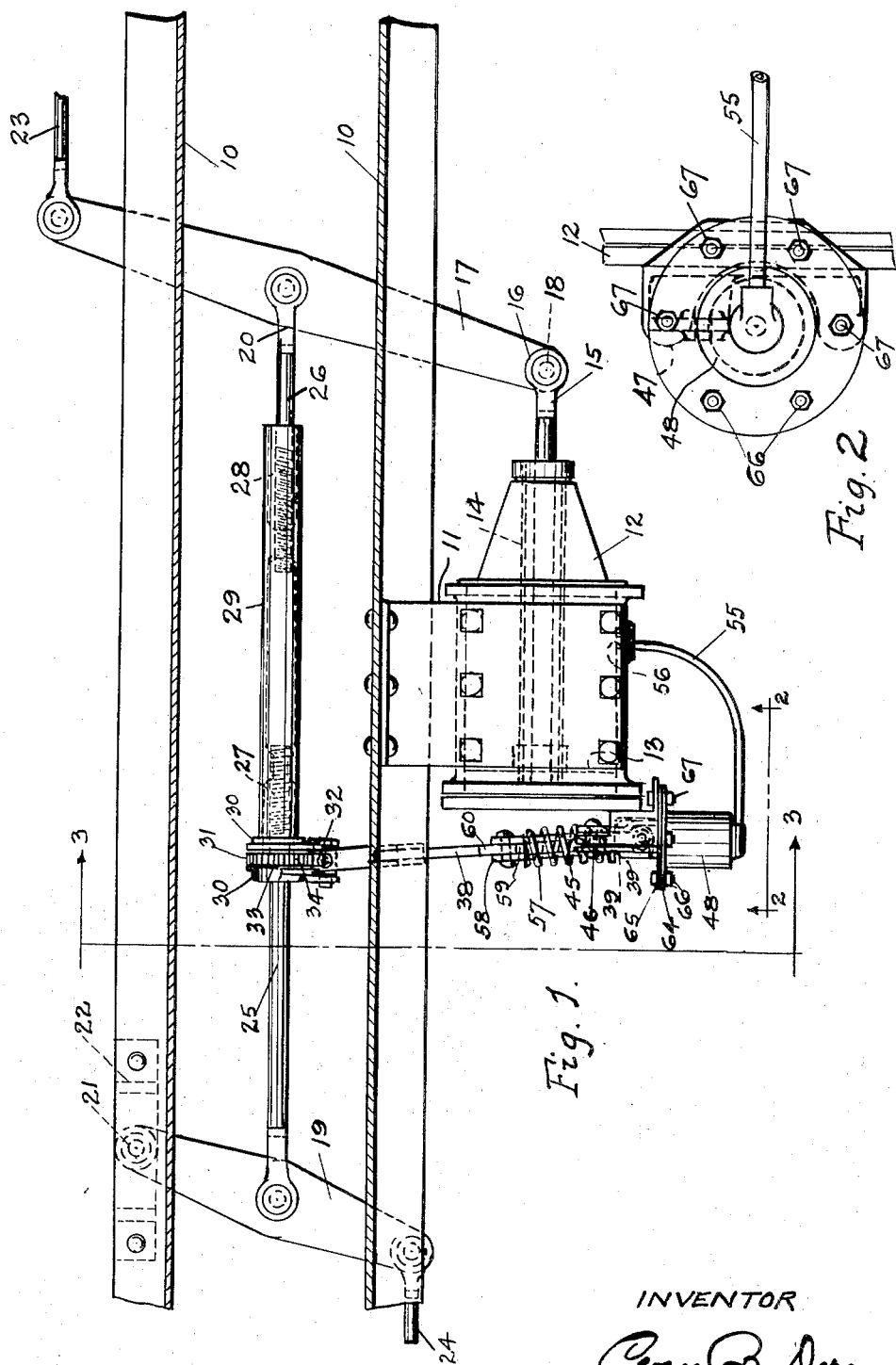
INVENTOR
George B. Dorey Nov. 13, 1956        G. B. DOREY        2,770,331
BRAKE SLACK ADJUSTER
Filed Feb. 7, 1955        2 Sheets-Sheet 2
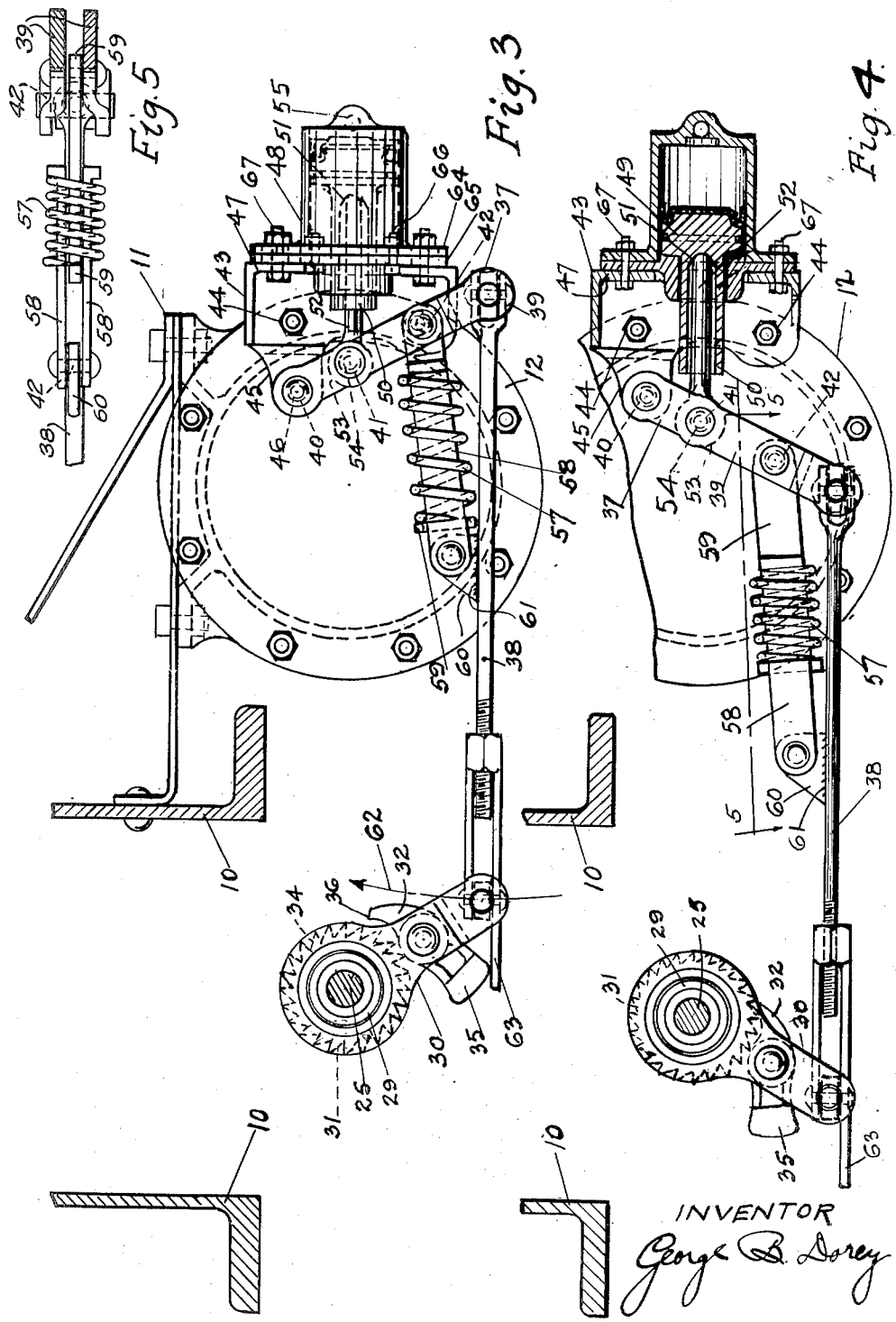
INVENTOR
George B. Dorey

United States Patent Office 2,770,331
Patented Nov. 13, 1956

2,770,331

BRAKE SLACK ADJUSTER

George B. Dorey, Westmount, Quebec, Canada

Application February 7, 1955, Serial No. 486,609

6 Claims. (Cl. 188—196)

The invention relates to an improved brake slack adjuster wherein a comparatively small cylinder auxiliary to the main air cylinder is employed in combination with a spring actuated lever system for operating a take-up device.

The objects of the invention among others are to provide an auxiliary cylinder for operating a slack adjuster which is so related to a mechanical lever and spring system as to permit for quick removal or application of said auxiliary cylinder without disturbing the mechanical system; to provide a novel method of operating a slack adjuster operating lever by means of a spring; and to provide a bracket, lever operating bar and spring assembly which may be readily applied to existing car equipment and manufactured as a packaged unit.

The improvement further resides in certain features of construction concerned with the details whereby the invention is carried out.

For further comprehension of the invention reference may be had to the accompanying drawings wherein:

Figure 1 is a plan view of part of the underframe of a railway car showing as much of the car as necessary to illustrate the application of the improved device in connection with the brake leverage system of a railway car and showing the rocking lever partly broken away.

Figure 2 is a fractional side elevational view showing on an enlarged scale the end view of the auxiliary cylinder and the mounting bracket therefor, said view being taken as seen on a line 2—2 of Fig. 1.

Figure 3 is a vertical transverse sectional view on an enlarged scale as seen on a line 3—3 of Fig. 1.

Figure 4 is a view similar to Fig. 3 except that the parts are shown as positioned with the piston of the auxiliary cylinder in fully extended position and the cylinder and piston are shown in section in order to better illustrate the parts.

Figure 5 is a top view of the spring assembly as seen on a line 5—5 of Fig. 4.

In said drawings 10—10 indicates the center sills of the car, 11 a mounting bracket for the main air cylinder and 12 the main air cylinder which is bolted or otherwise secured to the mounting bracket 11. The cylinder 12 is provided with a piston 13 with which is fixedly associated a hollow push rod 14 and within the latter a push rod proper 15 is loosely mounted. The push rod 15 is provided at its outer end with a pair of jaws 16 which connect with a brake lever 17 by means of a pintle 18.

The lever 17 is interconnected with another lever 19 by means of a connection rod 20 and said lever in turn is pivoted at 21 on a fixedly mounted bracket 22. The said levers 17 and 19 are connected at their outer ends with top connections 23 and 24 which in turn connect with the brakes of the respective trucks (not shown).

The connection rod 20 is divided lengthwise to present sections 25 and 26 and said sections are respectively screwthreaded at their adjacent ends to form right and left screwthreaded sections as seen at 27 and 28 respectively. The said screwthreaded sections 27 and 28 are united by a complementarily screwthreaded rotary take-up device 29 for varying the length of the connection by rotation of the take-up device and thereby compensate for excessive slack in the system.

Rotation of the take-up device is effected through the medium of a rocking lever 30 which is clutch connected with a ratchet wheel 31 by means of a pawl 32 pivotally mounted on the lever 30. The ratchet wheel 31 is fixedly mounted on the take-up device, preferably by being welded thereto as indicated at 33 and the periphery of the ratchet wheel is serrated to present a series of teeth 34. The pawl 32 is counterweighted at 35 to bias the detent 36 of the pawl into engagement with the teeth 34.

The pawl 32 thus operates to form a clutch connection between the lever and ratchet wheel when the former is rocked in one direction and rocks freely in declutched relation in the opposite direction.

Rocking movement of the lever 30 is effected through the medium of a pivotally mounted operating lever 37 and a bar connection 38 extending between the operated lever 30 and operating lever assembly 37. The operating lever assembly 37 preferably includes a pair of arms 39—39 having integrally formed ferrules 40, 41 and 42. The ferrules 40 constitute the pivotal mounting for the arms 39 on a bracket 43 which in turn is bolted or otherwise secured to the cylinder 11 as indicated at 44. The ferrules 40 are received in a web 45 of the bracket 43 and a rivet 46 extends through the said ferrules and web 45. The bracket 43 includes an angularly disposed wall section 47 on which is mounted an auxiliary cylinder 48. The cylinder 48 includes a piston 49 having an integrally formed hollow extension 50 formed with a concave pocket 51 for receiving the end of a push rod 52. The push rod 52 is formed with an eye head 53 which embraces the ferrules 41 and a rivet 54 extends through the said ferrules 41.

The auxiliary cylinder is connected with the main cylinder by means of connecting pipe 55 which extends between a releasing port 56 disposed in the side wall of the main cylinder. The port 56 is uncovered when the piston of the main cylinder extends beyond the said port and allows air to flow into the auxiliary cylinder and move the piston 49 forwardly taking along the push rod 52 and swinging the operating lever 37 and operated lever 30.

A spring 57 extends between the operating lever 37 and the connecting bar 38 and is preferably in the form of a compression spring interposed between shouldered yoke members 58 and 59, the former being pivotally united with a lug 60 welded to the connecting link 38 at 61. The yoke member 59 is extended to lie between the pair of arms and apertured to connect with ferrules 42. The spring 57 which is placed under initial compression operates to return the lever 37 after it has been displaced by air pressure and the releasing energy of the spring thus effects a swinging movement of the lever 30 in a direction to take up slack.

The placement of the spring to operate between the bar and operating lever dispenses with the necessity of providing special brackets for anchoring the dead end of the spring and furthermore communicates an upward turning movement to the bar as indicated by the arc 62.

The bar 38 is extended as at 63 to engage with the weighted end 35 of the pawl 32 as the lever 30 approaches the completion of the take-up movement for the purpose of declutching the pawl 32 from the ratchet wheel as will be seen by reference to Fig. 3. The force provided by the upward turning movement of the link as indicated by arc 62 is of importance in facilitating displacement of the pawl to inoperative position.

The auxiliary cylinder 48 is formed with a flange 64 to which is directly bolted a non-pressure head 65 by two bolts as indicated at 66. The auxiliary cylinder with its non-pressure head is then bolted in place on the bracket 43 by means of four bolts 67 which extend through wall 47 as well as through the non-pressure head 65 and the flange 64. It will be observed that the push rod 52 is loosely contained within the hollow extension 50 and that the auxiliary cylinder may be removed by the simple expedient of removing four bolts and disconnecting the pipe 55 and this without in any way disturbing the mechanical set up involved in the operation of the slack adjuster.

The arrangement providing for complete mechanical separation except bearing contact between the air cylinder and the mechanical working parts is of importance in maintaining service inasmuch as the air cylinder requires more frequent overhauling and cleaning than the mechanical structure operated thereby.

What I claim as new is:

1. In a slack adjuster for the brake leverage system of a railway car including a rod through which braking force is transmitted and a rotatable take-up device in said rod operable by rotation for varying the length of the connection and thereby compensating for slack in the system; a ratchet, lever and pawl structure for rotating the take-up device by rocking movement of the lever; the herein described improved means for rocking the lever including an operating lever swingable in a plane substantially parallel with the plane of swinging movement of the rocking lever; a bar pivotally connecting the respective levers; and a spring connecting the operating lever and bar and wholly carried thereby for moving the bar by changing the angular relation between the bar and operating lever.

2. In a slack adjuster for the brake leverage system of a railway car including a connection rod through which posed in said rod and operable by rotation to vary the length of the rod and thereby compensate for slack in braking force is transmitted and a take-up device inter- the system; a ratchet lever and pawl mechanism carried by the take-up device for rotation of the latter by rocking movement of the lever, said mechanism providing a clutch connection between the take-up device and lever when moved in one direction and rockable independently thereof when swung in the opposite direction; the herein described improved means for rocking the lever including an operating lever arm pivotally mounted at an appreciable distance from the rocking lever; a bar connecting said respective levers and a spring interconnecting the bar and operating lever arm, said connection between the spring and operating lever arm being located intermediate the pivots of the lever arm and operating to move the bar in a direction to take up slack by decreasing the angular relation between the bar and operating lever arm; and means for energizing the spring by swinging movement of the operating lever arm including an air operated cylinder having a movable member actuated thereby and acting on the said operating lever arm to open the angle between the latter and the bar and thereby energize the spring.

3. In a slack adjuster for the brake system of a railway car structure including a take-up device for taking up slack, said take-up device being operable by rotation and a lever carried by the take-up device to rotate in clutched relation therewith when swung in one direction and swing in the opposite direction in declutched relation; and a bar connected to the lever for operating the latter by reciprocation of the bar; the herein described improved mechanism for moving the bar including an operating lever pivoted at one end at a location disposed in fixed relation to the car structure and pivoted at its opposite end to the bar and a spring connected to the bar and to the operating lever intermediate its pivotal axes whereby the bar is moved by variation in the angular relation of the operating lever and bar.

4. In a slack adjuster for the brake system of a railway car structure including a take-up device for taking up slack, said take-up device being operable by rotation and a lever carried by the take-up device to rotate in clutch relation therewith when swung in one direction and swing in the opposite direction in declutched relation; and a bar carried by the lever for operating the latter by reciprocation of the bar; the herein described improved mechanism for moving the bar including a bracket carried by the car structure; an operating lever pivoted at one end to the bracket and at the opposite end to the bar; a spring connected to the bar and to the operating lever at a location intermediate said pivots whereby the spring tension operates to close the angle between the bar and operating lever and movement of the said operating lever in the opposite direction opens the angle between the bar and lever to energize the spring; and means acting on the operating lever intermediate its pivotal mounting on the bracket and the spring anchorage, said means including an air operated cylinder having a piston acting on the operating lever.

5. In a slack adjuster for the brake system of a railway car structure and including a rod through which braking force is transmitted, said rod including therein a take-up device operable by rotation for varying the length of the rod and thereby taking up slack in the system, and having means for rotating the take-up device including a rocking lever clutch connected with the take-up device to rotate therewith in one direction of movement and have independent movement in the opposite direction so that rocking movement of the lever does not rotate the take-up device and a reciprocating operating bar for moving the lever; the herein described improvement for moving the bar including an operating lever fulcrumed at one end at a location fixed with respect to the car structure and at its opposite end to the operating bar and a spring connected to the bar and to the operating lever at a location intermediate the ends of the latter; and an air operated cylinder having a piston acting on the operating lever at a location intermediate its fulcrum and the location of spring attachment on the operating lever for opening the angle between the said operating lever and bar and thereby energizing the spring.

6. In a slack adjuster for the brake system of a railway car structure including a take-up device for varying the relation between certain parts of the system and thereby taking up slack in the system and having a reciprocable bar for operating the take-up device; the herein described improved mechanism for operating the bar including: a bracket mounted at a location fixed with respect to the car structure, said bracket having a wall extending in the general direction of the bar and a wall substantially normal thereto, a lever pivoted at one end to the first named wall and at the opposite end to the bar; a spring connected to the bar and to the lever for moving the latter in a direction to take up slack; and an air cylinder secured to the normally disposed wall and having a piston acting on the lever to swing the latter in a direction to energize the spring, said piston of the air cylinder being related to the lever solely by bearing contact thereby permitting ready detachment of said cylinder without interference with the lever and its connected parts.

References Cited in the file of this patent

UNITED STATES PATENTS

| 487,636 | McKee | Dec. 6, 1892 |
| 1,060,613 | Mars | May 6, 1913 |
| 2,646,139 | Dorey | July 21, 1953 |